United States Patent
Fujita et al.

(10) Patent No.: US 8,959,434 B2
(45) Date of Patent: Feb. 17, 2015

(54) ADD-IN PROGRAM FOR UPLOAD, AUXILIARY PROGRAM FOR UPLOAD AND UPLOAD METHOD

(75) Inventors: Takeshi Fujita, Tokyo (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1184 days.

(21) Appl. No.: 12/439,886

(22) PCT Filed: Sep. 3, 2007

(86) PCT No.: PCT/JP2007/067153
§ 371 (c)(1),
(2), (4) Date: Jun. 28, 2010

(87) PCT Pub. No.: WO2008/029773
PCT Pub. Date: Mar. 13, 2008

(65) Prior Publication Data
US 2010/0269056 A1  Oct. 21, 2010

(30) Foreign Application Priority Data

Sep. 4, 2006 (JP) ................................. 2006-239636
Feb. 22, 2007 (JP) ................................. 2007-042697

(51) Int. Cl.
*G06F 3/0486* (2013.01)
(52) U.S. Cl.
CPC .................................... *G06F 3/0486* (2013.01)
USPC ........... 715/277; 715/205; 715/234; 715/240; 715/766; 715/769; 715/781
(58) Field of Classification Search
CPC ........ G06Q 10/00; G06Q 10/10; H04L 67/02; H04L 67/06; H04L 65/60; G06F 3/048; G06F 3/0482; G06F 3/0484; G06F 3/0486; G06F 17/211; G06F 17/2235; G06F 17/243; G06F 17/30165; G06F 17/3028; G06F 17/3089; G06F 15/16
USPC .......... 715/205, 234, 240, 277, 766, 769, 781
See application file for complete search history.

(56) References Cited

U.S. PATENT DOCUMENTS 6,230,185 B1 * 5/2001 Salas et al. .................... 709/205
6,313,855 B1 * 11/2001 Shuping et al. ............... 715/854
(Continued)

FOREIGN PATENT DOCUMENTS

JP 2002-132618 5/2002
JP 2002-230018 8/2002
(Continued)

OTHER PUBLICATIONS

Buyens, Microsoft Office FrontPage 2003 Inside Out; Sep. 2, 2003; Microsoft Press; pp. 49, 50, 81, 235. 156-158, and 231-235.*
(Continued)

*Primary Examiner* — Andrew Dyer
(74) *Attorney, Agent, or Firm* — K&L Gates LLP

(57) ABSTRACT

[PROBLEMS TO BE SOLVED] An HTML object or the like is easily uploaded to an outer information providing system. [MEANS FOR SOLVING THE PROBLEMS] A processing means of a terminal device adds a display area for displaying a web page to a part of a window of a predetermined program, receives the web page corresponding to a web page identifier read out from a memory means from an outer information providing system and displays it on the display area. When an object dragged by an input means is dropped at an HTML object of the web page displayed on the display area, an upload path associated with the HTML object is read out from the web page, data corresponding to the dropped object are acquired from a process of the dropping origin program and the acquired data are transmitted to make a memory means of the outer information providing system corresponding to the read-out upload path store the data.

4 Claims, 11 Drawing Sheets

(56) References Cited

U.S. PATENT DOCUMENTS

| | | | |
|---|---|---|---|
| 6,489,980 B1* | 12/2002 | Scott et al. | 715/854 |
| 6,728,762 B1* | 4/2004 | Estrada et al. | 709/218 |
| 6,791,582 B2* | 9/2004 | Linsey et al. | 715/751 |
| 6,968,539 B1* | 11/2005 | Huang et al. | 717/115 |
| 7,000,184 B2* | 2/2006 | Matveyenko et al. | 715/235 |
| 7,149,982 B1* | 12/2006 | Duperrouzel et al. | 715/788 |
| 7,181,468 B2* | 2/2007 | Spring et al. | 1/1 |
| 7,216,290 B2* | 5/2007 | Goldstein et al. | 715/234 |
| 7,240,282 B2* | 7/2007 | Nadamoto et al. | 715/234 |
| 7,243,079 B1* | 7/2007 | Manolis et al. | 705/26.81 |
| 7,278,092 B2* | 10/2007 | Krzanowski | 715/205 |
| 7,392,254 B1* | 6/2008 | Jenkins | 1/1 |
| 7,467,356 B2* | 12/2008 | Gettman et al. | 715/850 |
| 7,523,401 B1* | 4/2009 | Aldridge | 715/760 |
| 8,176,417 B2* | 5/2012 | Underhill et al. | 715/243 |
| 8,209,622 B2* | 6/2012 | Selig | 715/769 |
| 2002/0054052 A1* | 5/2002 | Sharma et al. | 345/700 |
| 2005/0068939 A1* | 3/2005 | Bangor et al. | 370/352 |

FOREIGN PATENT DOCUMENTS

| | | |
|---|---|---|
| JP | 2002-259805 | 9/2002 |
| JP | 2004-220319 | 8/2004 |
| JP | 2005-267614 | 9/2005 |
| JP | 2006-239636 | 9/2006 |
| JP | 2007-042697 | 2/2007 |

OTHER PUBLICATIONS

"Web Browser;" Microsoft Computer Dictionary; May 1, 2002; Microsoft Press; Fifth Edition, p. 708.*

Buyens, Microsoft Office FrontPage 2003 Inside Out; Sep. 2, 2003; Microsoft Press; p. 32.*

Microsoft FrontPage User's Guide; Nov. 1, 2003; Bellefonte Area School District Management of Information Systems (MIS) Department; pp. 1-10.*

Buyens, Microsoft Office FrontPage 2003 Inside Out; Sep. 2, 2003; Microsoft Press; pp. 331-113, 136-164, and 231-268.*

* cited by examiner

ADD-IN PROGRAM FOR UPLOAD, AUXILIARY PROGRAM FOR UPLOAD AND UPLOAD METHOD

CROSS-REFERENCE TO RELATED APPLICATIONS

This application is the National Stage of International Application No. PCT/JP2007/067153 filed Sep. 3, 2007, which claims the benefit of Japanese Patent Application No. 2006-239636 filed Sep. 4, 2006 and Japanese Patent Application No. 2007-042697 filed Feb. 22, 2007, the disclosures of which are incorporated herein by reference in their entireties.

TECHNICAL FIELD

The invention relates to add-in programs which extend function of designated programs of web browsers and others, especially add-in programs which make it easily feasible to upload objects of operating system or HTML on terminal to an external information provider system.

BACKGROUND

Add-in programs which extend function of HTTP clients, like web browsers are published as state of art, such as Japanese Patent Application 2006-239636 to Tokugan ("Tokugan").

The invention of Tokugan can afford to upload files stored in the terminal's HDD (Hard Disk Drive) to an external information provider system by the approach of the drag and drop operation on an object of an operating system to an object of HTML of the web page displayed on the web browser's display region.

However, the above invention at state of arts requires to pre display the web page containing the above object of HTML on the display region of the web browser. Moreover it gets the link-destination file data of an uploaded link from the external server and saves into the storage unit of the information provider system, it requires the heavy operations for the information provider system to acquire and manipulate the file.

Moreover it requires to update the add-in programs installed in the terminal for extending upload function. Function extension of uploading includes modification of upload paths, setting plural targets, changing subsidiary program of uploading and others.

Upload path means the upload destination on which objects of operating system are transferred to the external information provider, therefore URLs (Uniform Resource Locator) of the information provider system are applicable.

Moreover it cannot upload the HTML elements of the object of HTML contained in the web page displayed on the web browser display region to an external information provider system.

SUMMARY

The present invention provides noble approaches to improve the above drawbacks of the sate of arts, especially powerful approach to upload a file, a folder, an object of HTML and others to an external information provider system.

It provides to extend upload function which does not require updating of the add-in program themselves. It reduces the heavy performance for the information provider system to acquire and manipulate the file when it gets the link-destination file data of an uploaded link from the external server and saves into the storage unit of the information provider system.

An uploading add-in method may provide an upload function when run on a terminal. The terminal may include a storage unit, an input device, a display device, a network communication unit, and a processing unit. The storage unit may save a web page identifier of a web page which keeps an association between an HTML object and an upload path for uploading.

The processing unite may add a new display region on the window of a—prescribed program for displaying a web page. The processing unit may read a web identifier saved in the storage unit, get a corresponding web page from the storage unit or an external information provider system, and display the page on the new display region.

The processing unit may read the upload path associated with the HTML object in the new display region displayed web page. The new display region may include that on which an object dragged by the input unit is dropped. The processing unit may get the dropped object data from the process of drop source program and send the acquired data to the upload path's external information provider which stores it by the network communication unit.

DETAILED DESCRIPTION OF ILLUSTRATIVE EMBODIMENTS

The following notation is used in FIGS. 1-11.
10 Terminal
11 Interface bus
12 CPU (Processing Unit)
13 RAM (Storage Unit)
14 ROM (Storage Unit)
15 NIC (Network Communication Unit)

16 Keyboard (Input device)
17 Mouse (Input device)
18 Display (Display device)
19 HDD (Storage Unit)
20 Information Provider System
21 Interface bus
22 CPU (Processing Unit)
23 RAM (Storage Unit)
24 ROM (Storage Unit)
25 NIC (Network Communication Unit)
26 HDD (Storage Unit)
30 The Internet The system of the present disclosure makes it easy to upload files, folders, HTML objects and others to an external information provider system. It enables to extend the upload function without updating the add-in program itself. It can reduce the heavy load of the information provider system when it gets the file data corresponding to the uploaded link destination from the external information provider system and manipulates it to be saved in the storage unit in the information provider system.

Figure 1:
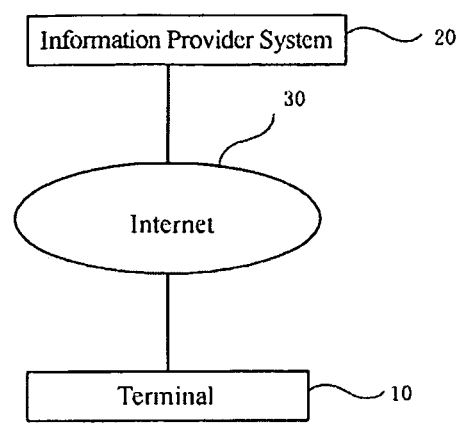
FIG. 1 is a diagram of the overall computer system.

FIG. 1 is the block diagram that shows the overall computer system. The terminal 10 and the information provider system 20 are connected to the Internet 30 that is communication networks. The connection style among the terminal 10 or the information provider system 20 and the Internet 30 is allowed to be wired or wireless.

Figure 2:
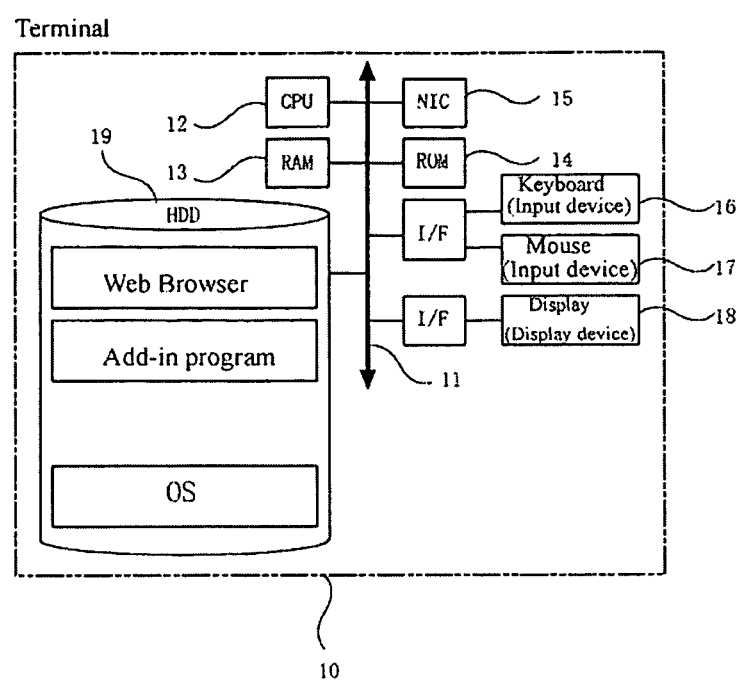
FIG. 2 is a structure diagram of an example terminal.

FIG. 2 is the structure diagram of the terminal 10. CPU 12 as processing unit, RAM 13, ROM 14 and HDD 19 (Hard Disk Drive) as storage unit, keyboard 16 and mouse 17 as input devices, Display 18 as display device, and NIC 15 (Network Interface Card) as network communication unit are connected with the interface bus 11. The web browser program, the add-in programs, operating systems and others are stored in HDD 19. The CPU of the terminal 10 driven by the web browser program can display the contents provided by the information provider system 20. The CPU of the terminal driven by the add-in programs can extends function of the web browser. The terminal 10 exploits Windows as operating system, without special notice, that is applicable. As the terminal 10, PC (Personal Computer), PDA (Personal Digital Assistance), Internet connectable mobile phones are all applicable, in an embodiment, PC is exploited.

Figure 3:
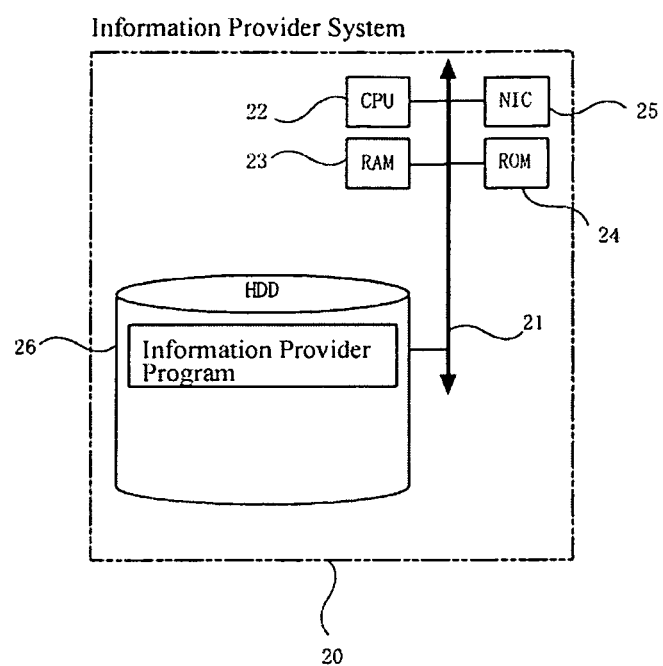
FIG. 3 is a structure diagram of an example information provider system.

FIG. 3 is the structure diagram of the information provider system 20. CPU 22 as processing unit, RAM 23, ROM 24 and HDD 26 (Hard Disk Drive) as storage unit, and NIC 25 (Network Interface Card) as network communication unit are connected with the interface bus 11. Information provider program and others are stored in HDD 26. The CPU of the information provider system 20 driven by the information provider program can provide contents. In an embodiment, a typical web browser is exploited as the information provider system 20.

Detail action of the computer system in an embodiment is described below.

Performance of Web Browser and Add-in Program

The CPU of terminal 10 event-driven by mouse clicking a designated icon performs the web browser. The CPU of the terminal 10 also performs the add-in program that extends facilities of the web browser. The CPU of the terminal 10 may perform the add-in program event-driven by the mouse or keyboard instructed by a user.

Figure 4:
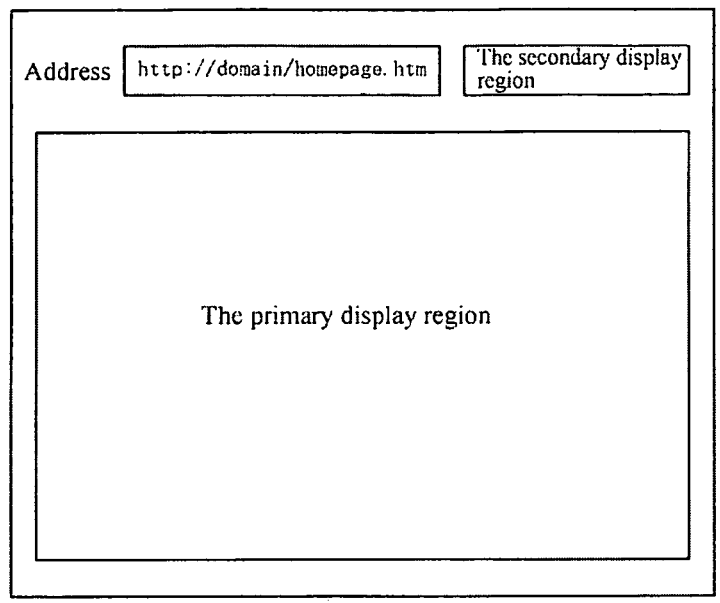
FIG. 4 is a structure diagram of the window of the web browser when the web browser and its add-in program runs.

FIG. 4 is the structure diagram of the web browser's window when the CPU of the terminal 10 performs the web browser and the add-in program. In all embodiments, INTERNET EXPLORER® is exploited as the web browser, without special description, that is applied all over.

The CPU of the terminal 10 driven by the web browser displays the primary display region. The CPU of the terminal 10 driven by the web browser receives URL from the keyboard and displays the web page corresponding to the received URL on the primary display region. The CPU of the terminal 10 driven by the add-in program process appends the secondary display region for displaying a web page, which is separated from the primary display region, to the web browser's window. In all embodiments, INTERNET EXPLORER® is exploited as the web browser, without special description, that is applied all over.

The CPU of the terminal 10 driven by the add-in program process reads URL of the web page displayed on the secondary display region by referring to the designated file saved in HDD. The CPU of the terminal 10 driven by the add-in program process sends to the information provider system 20 corresponding to URL a request of acquiring the web page corresponding to URL.

The CPU of the information provider system 20 driven by the information provider program process receives the above the request of acquiring the web page corresponding to URL from the terminal 10. The CPU of the information provider system 20 driven by the information provider program process reads the web page corresponding to URL from HDD and sends it to the terminal 10. The script for uploading an operating system object or a HTML object is embedded in the web page by corporation with the add-in program process. In an embodiment, JAVASCRIPT® is exploited as the script language.

The CPU of the terminal 10 by the add-in program process receives the web page corresponding to the above URL. The CPU of terminal 10 by the add-in program process displays the received web page on the secondary display region.

The above action of the terminal 10 is pre-preformed in the first, second, third and fourth embodiments.

Figure 5:
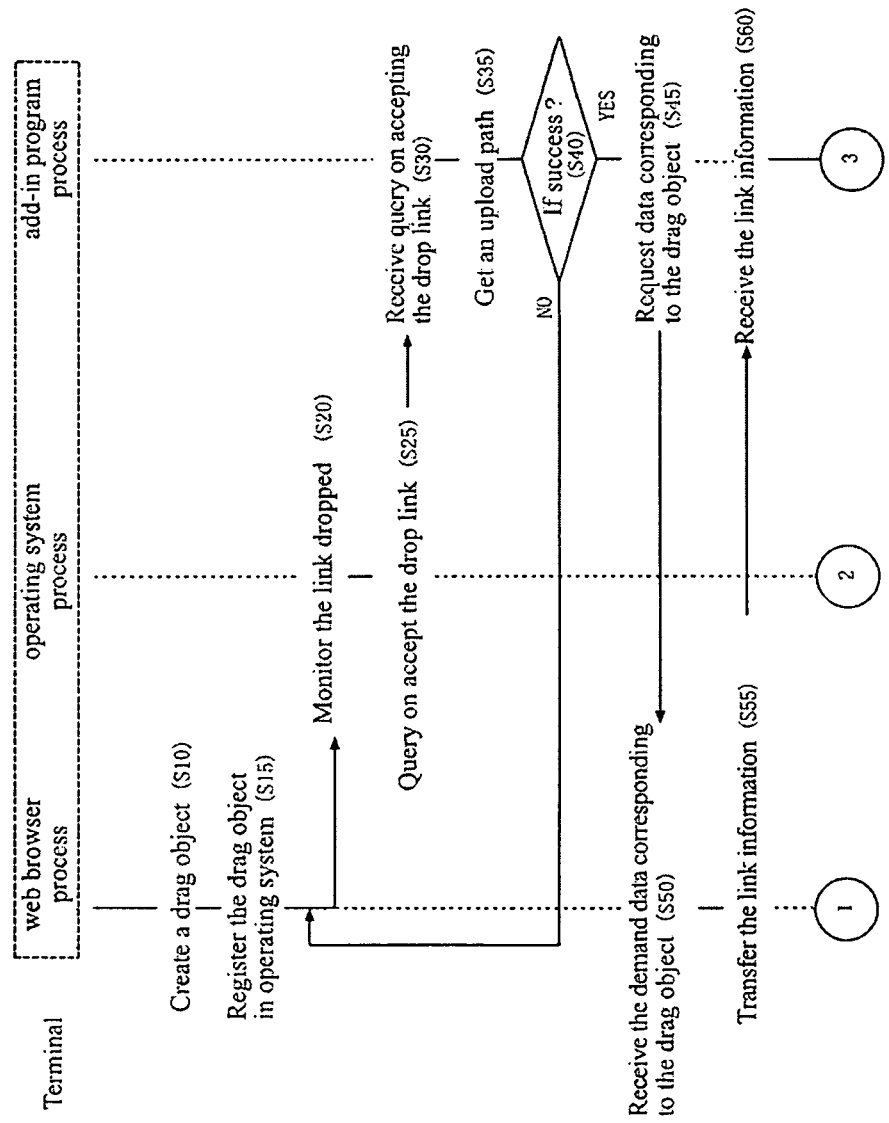
FIG. 5 is a flowchart of a terminal and an information provider system when the link as the HTML element contained in the web page displayed on the primary display region of the web browser is uploaded to the information provider system.
Figure 6:
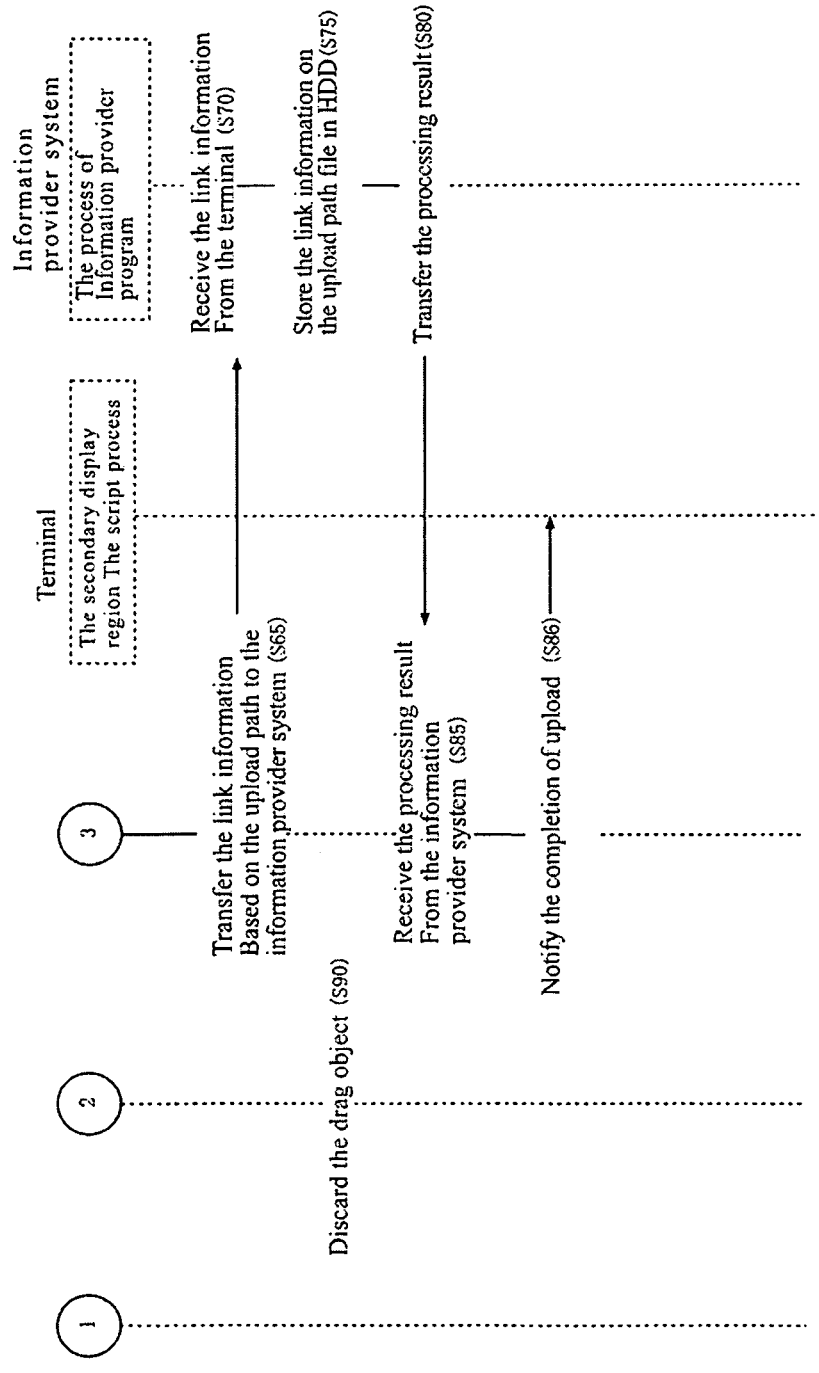
FIG. 6 is a continuing flowchart of FIG. 5.
Figure 7:
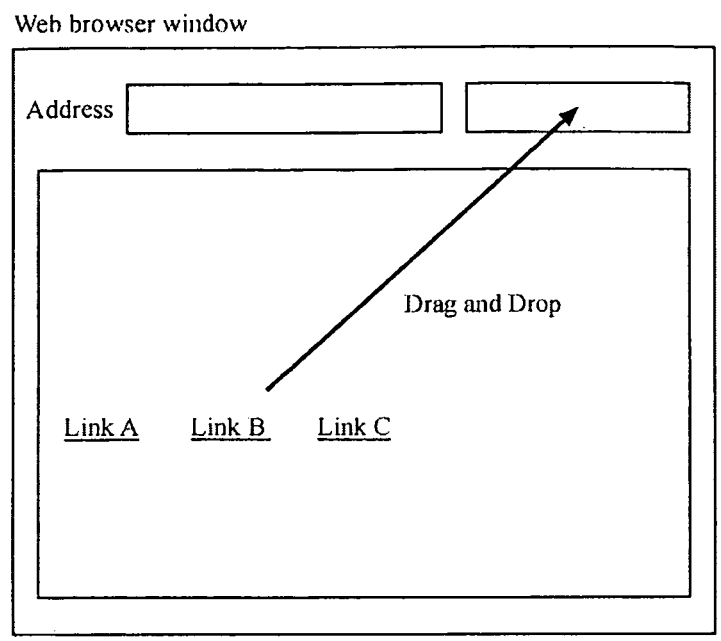
FIG. 7 is a structure diagram of an example window of the web browser at uploading the link as the HTML element included in the web page displayed on the primary display region of the web browser.

Regarding a first embodiment, FIG. 5 and FIG. 6 are the flowcharts of the terminal 10 and the information provider system 20 to upload the link as a HTML element contained in the web page displayed in the primary display region. FIG. 7 is a window structure of the web browser at uploading the link to the information provider system 20.

The CPU of the terminal driven by the web browser process creates a drag object of the operating system corresponding to the link when the link in the web page displayed in the primary display region is dragged out of it. (S10) That means the web browser process creates a WINDOWS® standard drag & drop object (IDataObject). The object can have plural information on the dropped object. S10 step should need at least a link URL.

The CPU of the terminal 10 driven by the web browser process registers the created drag object to the operating system. (S15) DoDragDrop API call of WINDOWS® can do such the registration. The CPU of the terminal 10 driven by the web browser process saves the association between the drag object corresponding to the HTML link and the link tag information into the storage unit like RAM.

The CPU of the terminal 10 driven by the operating system process performs the ordinary drag and drop action if the drag object is registered. Then the CPU of the terminal 10 driven by the add-in program process can occur a prescribed JAVASCRIPT® when the drag and drop object is registered and the mouse pointer is placed on the HTML object which contains the upload path in the secondary display region. In reality, the CPU of the terminal 10 driven by the add-in program process gets the mouse pointer location as dragging information from the operating system process. Then the CPU of the terminal 10 driven by the add-in program process gets a HTML object placed on the acquired mouse pointer location. And the CPU of the terminal 10 driven by the add-in program process checks whether the acquired HTML object has an upload path, and if so, occurs the designated JAVASCRIPT® event. That the object holds an upload path means that association between the object and the upload path is saved in the storage unit. To save the association between the object and the upload path can be realized by registering the upload path to the value of the property of the object when the information provider system 20 provides a web page.

The CPU of the terminal 10 driven by the operating system process monitors dropping the link in the secondary display region. (S20) Then CPU of the terminal 10 driven by the operating system process inquires to the add-in program process on accepting dropping the link. (S25)

The CPU of the terminal 10 driven by the add-in program process receives inquiry on accepting dropping the link. (S30) In reality, the CPU of the terminal 10 driven by the add-in program process gets the mouse pointer location as the dropping information from the operating system process. Then the CPU of the terminal 10 driven by the add-in process gets the HTML object placed on the acquired location and checks whether the HTML object holds upload paths or not.

The CPU of the terminal 10 driven by the add-in process gets the upload path if the dropped HTML object in the secondary display region holds it. (S35) In reality, the CPU of the terminal driven by the add-in program process gets the upload path by reading from the storage unit if the association between the HTML object and upload path is saved in the storage unit, like RAM. The CPU of the terminal 10 driven by the add-in program process performs the following processes by receiving the dropped link if it is successful to get the upload path. (S40)

The CPU of the terminal 10 driven by the add-in program process requests the corresponding drag object data to the web browser process via the drag object of the operating system. (S45)

The CUP of the terminal 10 driven by the web browser process receives the corresponding drag object data via the drag object of the operating system. (S50) The CPU of the terminal driven by the web browser process sends the link information of the corresponding drag object data to the add-in program process via the operating system. (S55) Link information is a link tag information saved in the storage unit such as RAM by association with the drag object.

The CUP of the terminal 10 gets link information from the web browser process via operating system. (S60) The CPU of the terminal 10 driven by the add-in program process can get 'link destination path' as link information by transferring the link information from the web browser process to the add-in program process. Moreover the CPU of the terminal 10 driven by the add-in program process can get 'link title' as the link information and the mouse pointer of link dropping place in the secondary display region.

The CPU of the terminal 10 driven by add-in program process sends the acquired link information to the information provider system 20 based on the acquired upload path. (S65) The CPU of the terminal 10 driven by the add-in program process can send a converted format of acquired link data based on demand, like link file format, to the information provider system 20. Moreover the CPU of the terminal 10 driven by the script process in the secondary display region can request to the information provider system 20 the permission that it gives the user's access capability on the uploaded link information at the same time of uploading.

The CPU of the information provider system 20 driven by the information provider system's process receives the link information from the terminal 10, (S70) and saves the received link information to the storage place corresponding to the upload path in the HDD's storage area of the information provider system 20. (S75) If the user has requested permission of access capability to the link information and link file at the sage of (S65), the information provider system 20 gives the permission of the access capability to the link information or the link file to the user. And the CPU of the information provider 20 driven by the information provider program process sends the processing results to the terminal 10. (S80)

The CPU of the terminal 10 driven by the add-in process receives the above result from the information provider system 20. (S85) The CPU of the terminal 10 driven by the add-in program process notifies the completion of upload to the script process embedded in the web page displayed in the secondary display region after receiving the result from the information provider system 20. (S86) In reality, the CPU of the terminal 10 driven by the add-in program process does the notification by performing a designated function defined in the script embedded in the web page displayed in the secondary display region. The CPU of the terminal 10 driven by the script process embedded in the web page displayed in the secondary display region can also display the message of the completion of uploading the link to the user by the event of performing the above function.

The CPU of the terminal 10 driven by the operating system process discards the drag object by the event of the add-in program process receiving the link information from the browser process. (S90)

By the above described Embodiment 1, to upload the link information of the HTML element to the external information provider system can be easily feasible.

Figure 8:
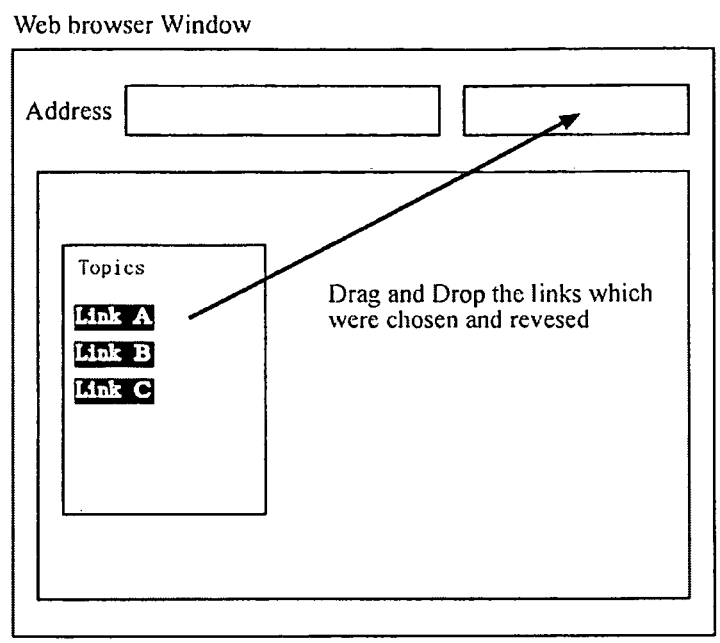
FIG. 8 is a structure diagram of an example window of the window browser when the table as HTML object displayed in the primary display region of the web browser is being uploaded.

A second embodiment is different from the first embodiment, where the drag and drop target is 'a designated range on the web page' rather than 'link'. FIG. 8 shows the structure of the window of the web browser where the table of the HTML elements contained in the web page displayed in the primary display region is uploading to the information provider system 20. The drag object created by INTERNET EXPLORER® already contains the tag information of the selected range on the web page and the actions of terminal 10 is basically the same as the first embodiment, therefore the description is omitted. In second embodiment, the table of the HTML elements can be selected by mouse dragging. The user can get to know his selecting range as reversed display. In the second embodiment, the CPU of the terminal 10 driven by the add-in program process, can send a HTML file containing the link information to the information provider system 20 based on the 'selected range tag information' as table information acquired from the web browser process at uploading the table information.

By the above described second embodiment, to upload 'a designated range on the web page's information like the table of HTML elements to the external information provider system can be easily feasible.

A third embodiment implements that drag and drop targets on web pages containing application written in HTML script as 'link' destination. The action of the terminal is basically same as the first embodiment. However, the third embodiment makes the terminal 10 to act as follows following (S86) of the first embodiment as follows:

The CPU of the terminal driven by the script process embedded in the web page displayed in the secondary display region (below called as 'the secondary display region script') sends request of acquiring update information to the information provider system 20. The update information is created by the information provider system 20 based on uploading a HTML object from the terminal 10 to the information provider 20 and is related to the uploaded data. In reality, the upload information contains the file identifier like URL for distancing the corresponding file data, MIME TYPE for identifying file class, a file type identifier like extension and the location where the HTML object corresponding to the file is dropped on the web browser displayed in the secondary display region. The practical usage of 'File identifier' and 'file type' is described later. 'The dropped location' is a virtual coordinate displayed in the secondary display region which displays the web page, and the CPU of the terminal 10 driven by the secondary display region script can display a designated icon depended on 'dropped location' on the secondary display region.

The CPU of the information provider system 20 receives the request of acquiring update information from the terminal 20. The CPU of the information provider system 20 driven by the information provider program process reads the update information requested from the storage unit like HDD, and returns it to the terminal 10.

The CPU of the terminal 10 driven by the secondary display region script process receives the update information from the information provider system 20. The CPU of the terminal 10 driven by the secondary display script process sends the request of acquiring the link file corresponding to the file identifier contained in the update information if the file identifier contained in the update information corresponds to the 'link file' to the information provider system 20.

The CPU of the information provider system 20 driven by the information provider program's process receives the request of acquiring the link file corresponding to the file descriptor from the terminal 10. The CPU of the information provider system 20 driven by the information provider program process reads the link file corresponding to the file identifier from the storage unit like HDD, and returns it to the terminal 10.

The CPU of the terminal 10 driven by the secondary display region script process receives the link file corresponding to the link file from the information provider system 20. The CPU of the terminal 10 driven by the secondary display script process can get 'link destination path' from the received link file. The CPU of the terminal 10 driven by the secondary display script process performs the following steps, if the acquired 'link destination path' contains 'designated file identifier' pre-stored in the web page displayed in the secondary display region. Here the web page corresponding to 'link destination path' is an application written by JAVASCRIPT®. For example, that 'link path' is 'http://domain/plugins/i/xxx.htm' and 'designated file descriptor' is 'http://domain/plugins' means 'link path' contains 'designate file identifier'.

The CPU of the terminal 10 driven by the secondary display region script process issues a XMLhttpRequest request to the information provider system 20, which instructs 'the information provider system 20 perform GET method on the link destination path acquired from the link file and return the result to the terminal 10'.

The CPU of the information provider system 20 driven by the information provider program process receives the above request from the terminal 10.

The information provider system 20 by the information provider program process performs GET method on the link destination path acquired from the link file and gets the web page corresponding to the link destination path from another information provider system which is specified by the link destination path. The web page corresponding to the link destination path contains an application program written in JAVASCRIPT®. The CPU of the information provider system 20 driven by the information provider program process sends the web page containing the web application to the terminal 10.

The CPU of the terminal 10 driven by the secondary display region script process receives the web page containing the web application from the information provider system 20. The CPU of the terminal 10 driven by the secondary display region script process modifies the application contained in received web page and enable the information provider system 20 to provide it. In reality, The CPU of the terminal 10 driven by the secondary display region script process gets characteristic images like thumbnail contained in the link destination web page and creates a new web page which can run the web application by clicking the image. The CPU of the terminal 10 driven by the secondary display region script process sends the created web page to the information provider system 20.

The CPU of the information provider system 20 driven by the information provider program process receives the above the web page from the terminal 10 and saves it into the storage unit like HDD. The CPU of the information provider system 20 driven by the information provider program process deletes the link file corresponding to file identifier contained in the update information. The CPU of the information provider system 20 driven by the information provider program process notifies completion of processing the web page sent by the secondary display region to the terminal 10 as response for the secondary display region.

The third embodiment described above makes it easy to upload a web page containing a web application program to an external information provider system 20. It should be remarked that the secondary display script has logic to get the web page containing a web application and manipulate it by storing the URL providing web applications as 'designated link destination path' into the web server, which provides a web page for the secondary display region. It should be also remarked that the CPU of the terminal 10 simply uploads the link by add-in program process similar to the first embodiment and notifies completion of upload to the secondary display region script process. Whenever the CPU of terminal 10 runs the add-in program, it can get a web page displayed in the secondary display region form the information provider system 20, therefore if the URL of the site providing web applications has been changed, the approach is so flexible only to change 'designated link destination path' of the web page displayed in the secondary display region, and not needs to update the add-in program.

Moreover if the providing way of the site providing web applications has been changed, without changing the add-in program, by changing the script logic embedded in the web page displayed in the secondary display region, it is possible to get a web page containing web applications and manipulate it, so the upload method can be updated. The terminal 10 manipulates the web page, which is acquired to be saved in the storage unit in the information provider system 20, therefore it can reduce the heavy load of the information system 20.

A fourth embodiment is the case of that the link destination of the drag and dropped targeted 'link' in the first embodiment is a web page providing video files like Flash format files. The action of the terminal 10 is the same as that in the first embodiment. In fourth embodiment, the terminal continues to perform the action below following S86 of fourth embodiment.

The CPU of the terminal 10 driven by the secondary display region script process by the event of S86 notification sends a request of acquiring update information to the information provider system 20. The update information is the same as that of the third embodiment, therefore its description is omitted.

The CPU of the information provider system 20 driven by the information provider program process receives the request of acquiring update information from the terminal 10. The CPU of the information provider system 20 driven by the information provider program process reads the update information requested for acquisition from the storage unit like HDD and sends it to the terminal 10.

The CPU of the terminal 10 driven by the secondary display region script process receives the update information from the information provider system 20. The CPU of the terminal 10 driven by the secondary display region script process sends a request of acquiring the link file to the information provider system 20 if the file identifier in the update information corresponds to the 'link file'.

The CPU of the information provider system 20 driven by the information provider program process receives the request of acquiring update information from the terminal 10. The CPU of the information provider system 20 driven by the information provider program process reads the link file corresponding to the file identifier from the storage unit like HDD and sends it to the terminal 10.

The CPU of the terminal 10 driven by the secondary display region script process receives the link file corresponding to the file identifier from the information provider system 20. The CPU of the terminal 10 driven by the secondary display region script process gets 'link destination path' from the received link file. The CPU of the terminal 10 driven by the secondary display region script process performs the action below if the acquired 'link destination path' includes 'the designated link identifier' saved in the web page displayed in the secondary display region. In the case that the 'link destination path' is 'http://domain/watch? v=xxx' and the designated file identifier' is 'http://domain', the 'link destination path' includes the 'destination file identifier'

The CPU of the terminal 10 driven by the secondary display region script process sends to the information provider system 20 a XMLHttpRequest which instructs it to 'perform a GET method on the link destination path acquired from the link file and sends the result to the terminal 20'.

The CPU of the information provider system 20 driven by the information provider program process receives the above request from the terminal 10. The CPU of the information provider system 20 driven by the information provider program process performs the GET method on the link destination path acquired from the link file and gets the web page corresponding to the link destination path from another information provider system which is specified by the link destination path. The web page corresponding to the link destination path is that of providing video files like Flash format. The CPU of the information provider system driven by the information provider program process sends the web page providing the video files to the terminal 10.

The CPU of the terminal 10 driven by the secondary display region script process picks up the file identifiers of URL identifying the video files and the characteristics images like thumbnail corresponding to the video files from the received web page. The CPU of the terminal 10 driven by the secondary display region script process creates a new web page, which does show the video file corresponding to the acquired file identifier by clicking the characteristics image. The CPU of the terminal 10 driven by the secondary display region script process sends the created web page to the information provider system 20.

The CPU of the information provider system 20 driven by the information provider program process receives the above web page from the terminal 10 and saves it into the storage unit like HDD. The CPU of the information provider system 20 driven by the information provider program process deletes the link file corresponding file identifier contained in the update information. The CPU of the information provider system 20 driven by the information provider program process notifies completion of processing the web page sent by the secondary display region to the terminal 10 as response for the secondary display region.

A fifth embodiment described above makes it easy to upload to an external information provider system 20 the web page that displays the video files, like FLASH format, which is related to the characteristic image, like thumbnail, by clicking on it. That says it is easy to upload it to the external information provider system 20 by associating a characteristic image like thumbnail corresponding to a video file, like a Flash format file, with the file identifier of the video file.

Whenever the CPU of terminal 10 runs the add-in program, it can get a web page displayed in the secondary display region form the information provider system 20, therefore if the URL of the site providing video files has been changed, the approach is so flexible only to change 'designated link destination path' of the web page displayed in the secondary display region, and not needs to update the add-in program.

Moreover if the providing way of the site providing video files has been changed, without changing the add-in program, by changing the script logic embedded in the web page displayed in the secondary display region, it can change the update method to associate the acquiring a characteristic image, like thumbnail corresponding to the video file, with the video file. It does not acquire a video file corresponding to the file identifier, it reduces heavy load of the information provider system 20 and the network communication unit. The terminal 10 manipulates the web page, which is acquired to be saved in the storage unit in the information provider system 20, therefore it can reduce the heavy load of the information system 20.

Performance of the File Management Program and the Add-In Program

A fourth embodiment applies the add-in program, which extends the function of the web browser to the file management program. The file management program means a program for file operations, like file coping, moving, deleting or others, WINDOWS® is applicable.

The CPU of terminal 10 event-driven by mouse clicking a designated icon performs the file management program. The CPU of the terminal 10 also performs the add-in program that extends facilities of the file management program. The CPU of the terminal 10 may perform the add-in program event-driven by the mouse or keyboard instructed by a user.

Figure 9:
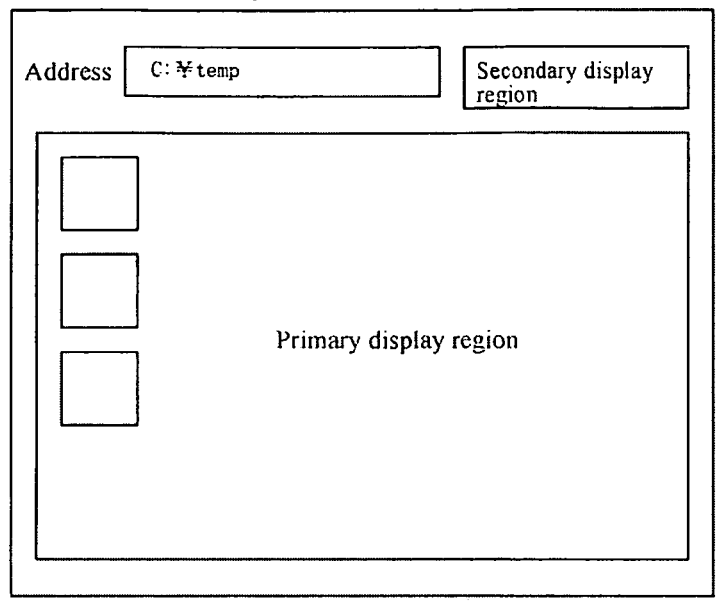
FIG. 9 is a structure diagram of an example window of the file management program when the file management program and its add-in program run.

FIG. 9 is the structure diagram of the file management's window when the CPU of the terminal 10 performs the file management program and the add-in program. The CPU of the terminal 10 driven by the file management program displays the primary display region showing the list of icons of files on the file management program' window. The CPU of the terminal 10 driven by the file management program receives the commands on the files from the keyboard or the mouse, and manipulates it, like copying, based on the received command. The CPU of the terminal 10 driven by the add-in program process, appends the secondary display region for displaying a web page, which is separated from the primary display region, to the file management program's window.

The CPU of the terminal 10 driven by the add-in program process reads URL of the web page displayed on the secondary display region by referring to the designated file saved in HDD. The CPU of the terminal 10 driven by the add-in program process sends to the information provider system 20 corresponding to URL a request of acquiring the web page corresponding to URL.

The CPU of the information provider system 20 driven by the information provider program process receives the above the request of acquiring the web page corresponding to URL from the terminal 10. The CPU of the information provider system 20 driven by the information provider program process reads the web page corresponding to URL from HDD and sends it to the terminal 10. The script for uploading an operating system object or a HTML object is embedded in the web page by corporation with the add-in program process. In EMBODIMENT 4, JAVASCRIPT® is exploited as the script language.

The CPU of the terminal 10 driven by the add-in program process receives the web page corresponding to the above URL. The CPU of terminal 10 by the add-in program process displays the received web page on the secondary display region.

Figure 10:
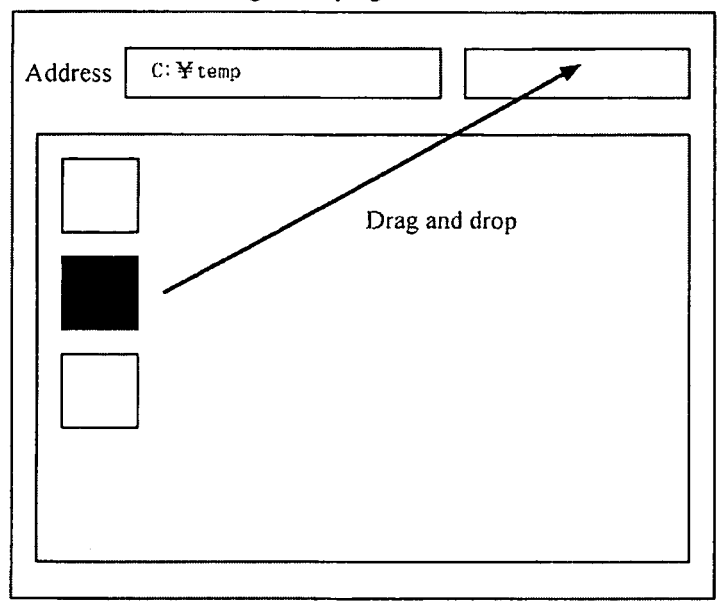
FIG. 10 is a structure diagram of an example window of the file management program when the file corresponding to the icon displayed in the primary display region of the file management program is being uploaded.

The above action of the terminal 10 is preformed in advance to latter described Regarding a fifth embodiment, FIG. 10 is the structure diagram of the window of the file management program when the file corresponding to the icon displayed on the primary display region of the file program is uploaded to the information provider system 20.

The CPU of the terminal 10 driven by the file management program creates a drag object of the operating system corresponding to the icon caused by dragging on the icon displayed in the primary display region. The CPU of the terminal 10 driven by the file management program process registers the created drag object to the operating system. The CPU of the terminal 10 driven by the file management program process associates the association of drag object corresponding to the icon and the file path corresponding to the icon and saves the association to the storage unit, like RAM and others The CPU of the terminal 10 driven by the operating system process performs the ordinary drag drop action if the drag object registered. Then the CPU of the terminal 10 driven by the add-in program process can occur a prescribed JAVASCRIPT® when the drag drop object is registered and the mouse pointer is placed on the HTML object which contains the upload path in the secondary display region. In reality, the CPU of the terminal 10 driven by the add-in program process gets the mouse pointer location as dragging information from the operating system process. Then the CPU of the terminal 10 driven by the add-in program process gets a HTML object placed on the acquired mouse pointer location. And the CPU of the terminal 10 driven by the add-in program process checks whether the acquired HTML object has an upload path, and if so, occurs a designated JAVASCRIPT® event. That the object holds an upload path means that association between the object and the upload path is saved in the storage unit. To save the association between the object and the upload path can be realized by registering the upload path to the value of the property of the object when the information provider system 20 provides a web page.

The CPU of the terminal 10 driven by the operating system process monitors the dropping the icon in the secondary display region. Then CPU of the terminal 10 driven by the operating system process inquires to the add-in program process whether accepting or dropping the icon.

The CPU of the terminal 10 driven by the add-in program process receives inquiry on whether accepting the dropping of the icon. In reality, the CPU of the terminal 10 driven by the add-in program process gets the mouse pointer location as the dropping information from the operating system process. Then, the CPU of the terminal 10 driven by the add-in process gets the HTML object placed on the acquired location and checks whether the HTML object holds upload paths or not.

The CPU of the terminal 10 driven by the add-in process gets the upload path if the dropped HTML object in the secondary display region holds it. In reality, the CPU of the terminal 10 driven by the add-in program process gets the upload path by reading from the storage unit if the association between the HTML object and upload path is saved in the storage unit, like RMA. The CPU of the terminal 10 driven by the add-in program process performs the following processes by receiving the dropped icon if it is successful to get the upload path.

The CPU of the terminal 10 driven by the add-in program process requests the corresponding drag object data to the file management program process via the drag object of the operating system.

The CUP of the terminal 10 driven by the file managing program process receives corresponding drag object data via the drag object of the operating system. The CPU of the terminal 10 driven by the file management process sends the file corresponding to the icon as the corresponding drag object data to the add-in program process via the operating system.

The CUP of the terminal 10 driven by the add-in program process gets the file corresponding to the icon from the file program process via operating system.

The CPU of the terminal 10 driven by the add-in program process sends the file corresponding to the above dropped icon based on the above acquired upload path to the information provider system 20.

The CPU of the information provider system 20 driven by the information provider system's process receives the file corresponding to the dropped icon from the terminal 10, and saves the received file to the storage place corresponding to the upload path in the HDD's storage area of the information provider system 20. And the CPU of the information provider system 20 driven by the information provider program process sends the processing results to the terminal 10.

The CPU of the terminal 10 driven by the add-in process receives the above result from the information provider system 20.

The CPU of the terminal 10 driven by the add-in program process notifies the completion of upload to the script process embedded in the web page displayed in the secondary display region after receiving the result from the information provider system 20. In reality, the CPU of the terminal 10 driven by the add-in program process does the notification by performing a designated function defined in the script embedded in the web page displayed in the secondary display region. The CPU of the terminal 10 driven by the script process embedded in the web page displayed in the secondary display region can also display the message of the completion of upload the file to the user by the event of performing the above function.

The CPU of the terminal 10 driven by the operating system process discards the drag object by the event of the add-in program process receiving all files corresponding to the icon from the file management program process.

The number of files for uploading is not necessary only one per an operation. For example, it is possible for several files to be chosen at the same time and uploaded to the server as streaming by a drop operation. In this case the add-in program process sequentially uploads each file based on the data acquired from the file management program process via operating system. In the case of the folder being dropped, the add-in program sequentially gets the files or folders in the dropped holder and it can upload each of them to the path associated with drop source file in the operating system based on the upload path acquired from the obtained HTML object.

The fifth embodiment makes it easy to upload the file as the object of the operating system to the external information provider system 20.

Performance of the Operating System and the Add-In Program

An embodiment applies the add-in program, which extends the function of the file management, to the desktop task bar. In this embodiment, WINDOWS® is exploited as operating system.

The CPU of terminal 10 event-driven by the power-on performs the operating system. The CPU of the terminal 10 also performs the add-in program that extends facilities of the operating system. The CPU of the terminal 10 may perform the add-in program event-driven by the mouse or keyboard instructed by a user.

Figure 11:
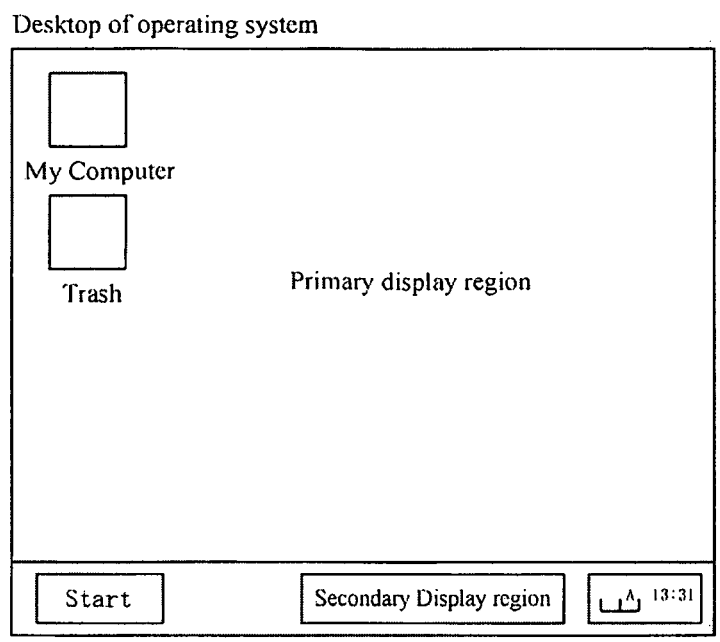
FIG. 11 is a desktop structure diagram of an example operating system when the operating system and the add-in program run.

FIG. 11 is the structure diagram of the desktop of the operating system file when the CPU of the terminal 10 performs the operating system and the add-in program. The CPU of the terminal 10 driven by the operating system displays the desktop with a task bar.

Because the desktop corresponds to a specific holder in the file management program, the display region of the task bar corresponds to the primary display region of the file management program. The CPU of the terminal 10 driven by the add-in program process appends the secondary display region for displaying a web page to the task bar.

The CPU of the terminal 10 driven by the add-in program process reads URL of the web page displayed on the secondary display region by referring to the designated file saved in HDD. The CPU of the terminal 10 driven by the add-in program process sends to the information provider system 20 corresponding to URL a request of acquiring the web page corresponding to URL.

The CPU of the information provider system 20 driven by the information provider program process receives the above the request of acquiring the web page corresponding to URL. The CPU of the information provider system 20 driven by the information provider program process reads the web page corresponding to URL from HDD and sends it to the terminal 10. The script for uploading an operating system object or a HTML object to the information provider system 20 by cooperating the add-in program process is embedded in the web page. In EMBODIMENT 5, JAVASCRIPT® is exploited as the script language.

The CPU of the terminal 10 driven by the add-in program process receives the web page corresponding to the above URL. The CPU of terminal 10 by the add-in program process displays the received web page on the secondary display region. The approach of uploading text files or others by the operating system or the add-in program in an embodiment is the same as that of the fifth embodiment, therefore description is omitted.

By the above embodiment, to upload the files as objects of the operating system to the external information provider system 20 is easily accomplished by dropping the icon corresponding to the file displayed on the primary display region of the window of the file management program onto the secondary display region, which is appended to the task bar of the operating system 20. Also, to upload the links displayed on the primary display region of the web browser to the external information provider system 20 is easily accomplished by dropping the link displayed on the primary display region of the window of the web browser onto the secondary display region, which is appended to the task bar of the operating system.

Change Upload Paths and Multiple Setting

In all embodiments, the web page displayed on the secondary display region is provided from the information provider system 20. The web page is embedded with the association between the HTML object and the upload path. The CPU of the terminal 10 receives the web page from the information provider system 20 and creates an association between the HTML object stored in the web page and the upload path and save it into the storage unit like RAM.

By the above approach, only to change the upload path associated with the HTML object saved in the web page displayed on the secondary display region, which is provided from the information provider system 20, can change the upload destination of uploading an operating system object and others from the terminal 10, without uploading the add-in program itself of the terminal 10. Moreover to save multiple associations between HTML objects and upload paths of the web page provided by the information provider system 20, which is displayed on the secondary display region, without updating the add-in program itself of the terminal 10, enables to chose one of one of the multiple upload destinations by changing the dropped HTML object at uploading the operating system object from the terminal 10.

To save a HTML object related to commercial or service advertisements in the web page provided from the information provider system 20, which is displayed on the secondary display region, can provides a new style of advertisements.

Different styles of embodiments can be considered within the concept of the invention. Even though the web page displayed on the secondary display region is one provided by an external information provider system (called the external web sever) which is different from the original information provider system 20, (called the external web page), it can upload the file to the information provider system 20 if the upload path is described by the designated method be interpretable for the add-in program. On the secondary display region, external web pages acquired from multiple external information provider systems can be displayed. In the case of displaying the plural web pages, at least one of which may be provided from the information provider system 20.

It is possible that by depending on the upload destination displayed on the secondary display region the users sharing the file can be switched immediately to other one. To provide with users the method of setting the attribute of the HTML object displayed on the secondary display region at arbitrary timing can set the user who automatically shares the file at the dropping for updating the dropped path. For such the setting, it is enough to login to the information provider system in a different way from the primary display region that is ordinary used by the web browser. The change of settlement reflects on the secondary display region at later invocation, the acting invoked web page displayed on the secondary display page can reflect on the change of settlement if the web page is reloaded periodically from the information provider system. The dropping the link acquired from the web browser on the secondary display region displayed on the tool bar of the file management program or the desktop tool can be set to do the same action of the dropping it on the tool bar of the web browser, or, the dropping the file or folder on the secondary display region of the web browser can be set on the same action of the dropping it on the secondary display region of the file management program or desktop.

The dropping strings selected by text editor on the secondary display region can be uploaded to a server by creating a text file by the add-in program process.

The dropping strings by a text editor or a certain range selected from the HTML page like the second embodiment, if the designated string is included in that, can be monitored by the add-in program process or the information provider program process, then the same action of the third embodiment or fourth embodiment is done, it may be considered that the web page displayed on the secondary display region can do acquiring a file from the information provider system and manipulating it. The approach of uploading the information which the terminal 10 acquires via the information provider system 20 and manipulates as introduced in third embodiment and the fourth embodiment can treat a acquired file as content data like audio, image or video more than web pages.

If the CPU of the terminal 10 driven add-in program process can read the upload path pre-saved in the storage unit of terminal 10, like HDD, the secondary display region is not necessarily demanded to upload the object of HTML or others to an external information provider system. In the third embodiment and the fourth embodiment, if the link destination path is pre-defined, the CPU of the terminal driven the script process embedded in the web page displayed on the secondary display region does the designated manipulation. But if the CPU of the terminal 10 driven by the add-in program process does the designated manipulation at uploading, it need not to notify to the script process displayed on the secondary display region after uploading to the information provider system 20, therefore the secondary display region is not necessarily demanded.

The invention claimed is:

1. A computer implemented uploading add-in method provides an upload function when run on a terminal comprising a storage unit, an input device, a display device, a network communication unit, and a processing unit, wherein the storage unit saves a web page identifier of a web page which keeps an association between an HTML object and an upload path for uploading, the method comprising:
    adding, into an open web browser window having a primary display region displaying a first web page and an address region outside the primary display region, by the processing unit, a new secondary display region inside the address region and separate from the primary display region, the primary display region displaying the first web page based on a uniform resource locator (URL) in the address region, and the new secondary display region for displaying a different web page, wherein the new secondary display region is smaller than the primary display region by being shorter in height and narrower in width than the primary display region, the address region is located above the primary display region in the open web browser window, and the new secondary display region is located horizontally adjacent to the URL in the address region, such that the open web browser window includes both the primary display region displaying the first web page and the new secondary display region for simultaneously displaying the different web page horizontally adjacent to the URL in the address region and above the primary display region;
    reading, by the processing unit, a first web page identifier which keeps the association between the HTML object and the upload path for uploading saved in the storage unit, acquiring a corresponding second web page from the storage unit or a first external information provider system, and displaying the second web page on the new secondary display region horizontally adjacent to the URL in the address region outside and above the primary display region;
    reading, by the processing unit, the upload path associated with the HTML object in the new secondary display region, on which an object dragged by the input unit from the first web page is dropped; and
    acquiring, by the processing unit, the dropped object data from a process of a drop source program and sending, by the network communication unit, the acquired data to the first external information provider system which stores the acquired data.

2. The method of claim 1, further comprising:
    acquiring, by the processing unit, the dropped object data from the first external information provider system by receiving notification of upload completion from an uploading add-in program;
    if the acquired data saves a link path in the second web page on the new secondary display region, including file identifier, acquiring, by the processing unit, the link path file data from a second information provider system specified by the link path via the first external information provider system; and
    creating, by the processing unit, a new file based on the acquired data and sending, by the network communication unit, the created file to the first external information provider system to store the created file.

3. A computer implemented upload method used by a computer system comprising a terminal and an information provider system that are connected with a network communication unit, the method comprising:
    adding, into an open web browser window having a primary display region displaying a first web page and an address region outside the primary display region, by a processing unit of the terminal, a new secondary display region inside the address region and separate from the primary display region, the primary display region displaying the first web page based on a uniform resource locator (URL) in the address region, and the new secondary display region for displaying a different web page, wherein the new secondary display region is smaller than the primary display region by being shorter in height and narrower in width than the primary display region, the address region is located above the primary display region in the open web browser window, and the new secondary display region is located horizontally adjacent to the URL in the address region, such that the open web browser window includes both the primary display region displaying the first web page and the new secondary display region for simultaneously displaying the different web page horizontally adjacent to the URL in the address region and above the primary display region, reading a web page identifier which keeps an association between an HTML object and an upload path for uploading saved in a storage unit, acquiring a corresponding second web page from the storage unit or first external information provider system, and displaying the second web page on the new secondary display region horizontally adjacent to the URL in the address region outside and above the primary display region, reading the upload path associated with the HTML object in the new secondary display region, on which an object dragged by an input unit from the first web page is dropped;
    acquiring, by the processing unit of the terminal, dropped object data from a process of drop source program and sending, by the network communication unit, the acquired data to the first external information provider system which stores the acquired data;

receiving, by a processor unit of the information provider system, data corresponding to the dropped object from the terminal, storing the data corresponding to the dropped object in a storage unit of the information provider system corresponding to the upload path, and notifying to the terminal of completion of uploading the dropped object data;

receiving, by the processor unit of the terminal, notification of completion of uploading the dropped object data from the information provider system, if the processor unit receives the notification, then the processor unit sends a get request of the dropped object data to the information provider system;

receiving, by the processor unit of the information provider system, the get request of the dropped object data and reading the dropped object data from the storage unit of the information provider system, and sending the dropped object data to the terminal;

receiving, by the processor unit of the terminal, the dropped object data from the information provider system, and if the acquired data saves a link path in the second web page on the new secondary display region, including a file identifier, sending a first request demanding:
  get the file data corresponding to the link path and send the acquired data to the terminal
to the information provider system;

receiving, by the processor unit of the information provider, the first request, and based on the first request, acquiring the link path file data from a second information provider system specified by the link path and sending the acquired file data to the terminal;

receiving, by the processor unit of the terminal, the file data corresponding to the link path from the information provider system, and based on the received file data, creating a new file and sending the created file to the information provider system to store the created file; and receiving, by the processor unit of the information provider system, the created file from the terminal and storing the created file in the storage unit.

4. The method of claim 3, wherein said creating a new file based on the received file data comprises following the logic of a script embedded in the second web page displayed on the new secondary display region.

* * * * *